(12) United States Patent
Bidner et al.

(10) Patent No.: US 7,921,833 B2
(45) Date of Patent: Apr. 12, 2011

(54) FUEL INJECTION CONTROL DURING START-UP

(75) Inventors: David Karl Bidner, Livonia, MI (US);
John M. Roth, Grosse Ile, MI (US);
Mark Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 12/407,263

(22) Filed: Mar. 19, 2009

(65) Prior Publication Data
US 2010/0236518 A1 Sep. 23, 2010

(51) Int. Cl.
*F02B 47/04* (2006.01)
*F02M 25/14* (2006.01)

(52) U.S. Cl. .................. 123/685; 123/1 A; 123/305

(58) Field of Classification Search .................. 123/1 A, 123/305, 685
See application file for complete search history.

(56) References Cited

U.S. PATENT DOCUMENTS

| 6,543,419 | B2 | 4/2003 | Okamoto et al. | |
|---|---|---|---|---|
| 6,758,201 | B2 | 7/2004 | Hosoi | |
| 6,769,625 | B2 | 8/2004 | Peterson, Jr. | |
| 7,043,350 | B2 | 5/2006 | Abe et al. | |
| 7,219,650 | B2 | 5/2007 | Nagano et al. | |
| 7,303,144 | B2 | 12/2007 | Alyanak | |
| 7,694,666 | B2 * | 4/2010 | Lewis et al. | 123/519 |
| 7,721,710 | B2 * | 5/2010 | Leone et al. | 123/431 |
| 2007/0119425 | A1 * | 5/2007 | Lewis et al. | 123/478 |
| 2007/0215069 | A1 * | 9/2007 | Leone | 123/1 A |
| 2008/0283023 | A1 * | 11/2008 | Lewis et al. | 123/344 |

* cited by examiner

*Primary Examiner* — Erick Solis
(74) *Attorney, Agent, or Firm* — Allan J. Lippa; Alleman Hall McCoy Russell & Tuttle LLP

(57) ABSTRACT

A method of operation of an internal combustion engine including an intake valve coupled to a combustion chamber, and a port fuel injector positioned upstream of the intake valve in an intake manifold including a throttle, the port fuel injector fluidly coupled to a fuel rail included in a fuel delivery system housing a fuel at least partially composed of alcohol. The method including, during a start-up operation when the temperature of the engine is below a threshold value and fuel is actively being injected into the intake manifold, adjusting a cone angle of a fuel spray from the port fuel injector, via adjustment of the throttle and/or fuel delivery system, based on the position of the intake valve.

20 Claims, 4 Drawing Sheets

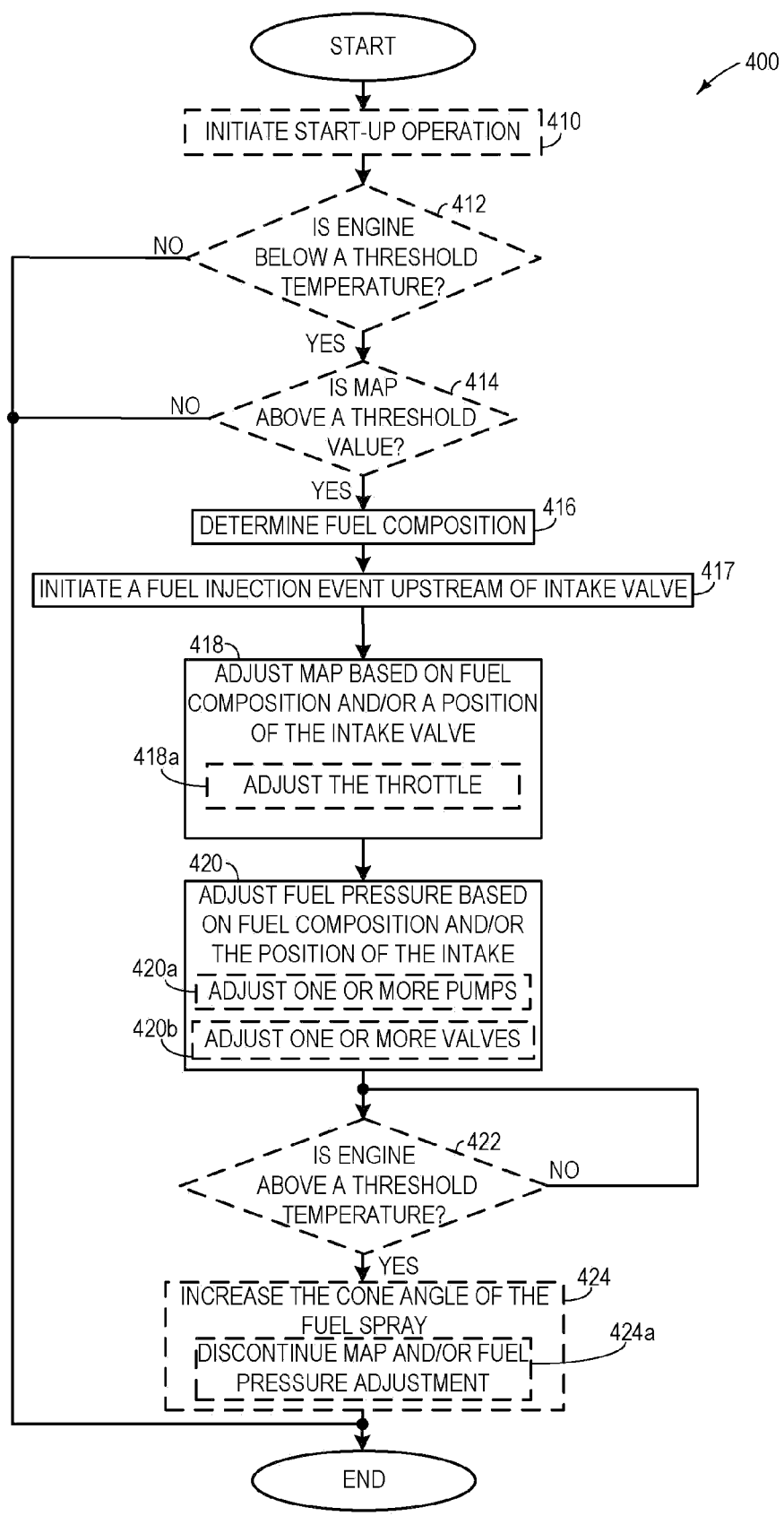

FUEL INJECTION CONTROL DURING START-UP

BACKGROUND AND SUMMARY

Various fuel injection approaches may be used in internal combustion engines. However, wall wetting has slowed efforts to improve fuel injection performance and combustion efficiency. In particular, under certain operating conditions wall wetting may lead to bore wash, thereby increasing combustion inefficiencies and degrading engine components, such as pistons, piston rings, etc., leading to increased emissions as well as increased repair costs. Additionally, wall wetting may also increase fuel loss during valve overlap when fuel travels into the exhaust passage from the intake manifold, increasing emissions and decreasing engine efficiency. Moreover, the use of alcohol within the fuel delivery system may exacerbate fuel loss during valve overlap as well as bore wash, further degrading engine operation.

It has been found that during various operating conditions engine performance may be increased by varying the angle of a fuel spray cone from a port fuel injector. U.S. Pat. No. 7,043,350 discloses a system in which the temperature of the fuel injector is altered to adjust the cone angle of the fuel spray. The angle of the fuel spray cone, delivered via a fuel injector, is adjusted by a heating device. Specifically, the temperature of the fuel injected may be adjusted via a heater directly coupled to the fuel injector.

However, the inventors herein have recognized several disadvantages with such an approach. The heater may increase the servicing and repair costs of the engine. Moreover, the size of the fuel spray cone may be limited by the ambient temperature. The limited spray cone size may become particularly problematic during cold-starts. For example, during a cold-start the spray cone size cannot be reduced beyond a threshold value proportional to the ambient temperature, leading to increased bore wash, fuel loss during valve overlap, and combustion inefficiencies.

In one approach, the above issues may be addressed by a method of operation of an internal combustion engine including an intake valve coupled to a combustion chamber, and a port fuel injector positioned upstream of the intake valve in an intake manifold including a throttle, the port fuel injector fluidly coupled to a fuel rail included in a fuel delivery system housing a fuel at least partially composed of alcohol. The method may include, during a start-up operation when the temperature of the engine is below a threshold value and fuel is actively being injected into the intake manifold, adjusting a cone angle of a fuel spray from the port fuel injector, via adjustment of the throttle and/or fuel delivery system, based on the position of the intake valve (e.g., based on whether the fuel injection is open intake valve fuel injection or closed intake valve fuel injection).

In one example, the method includes decreasing the cone angle during open valve injection. By decreasing the cone angle during open valve injection, the wall wetting within the combustion chamber and the intake manifold may be decreased, thereby decreasing bore wash as well as fuel loss during valve overlap. In this way, wear on various engine components, such as the combustion chamber, piston, seals, etc., as well as the emissions from the vehicle may be reduced. Furthermore, by decreasing the cone angle of the fuel spray during engine start-up operation, the vaporization of the fuel during combustion (e.g. the power stroke) may be increased due to the increased charge density within the combustion chamber. Thus, the efficiency of the engine may be increased when the spray cone angle is reduced.

As another example, the method may include decreasing the cone angle during closed valve injection. Therefore, by decreasing the cone angle during closed valve injection, the fuel puddle may be localized to the valve seat, thereby decreasing wall wetting, leading to the aforementioned benefits (e.g. decreased fuel loss during valve overlap and engine wear).

As yet another example, the cone angle of the cone angle may be alternatively and/or additionally adjusted based on an alcohol content of the fuel. Specifically, during engine starting, the cone angle may be decreased as the percentage or amount of alcohol in the fuel is increased. Therefore, the increased wall wetting caused by the alcohol may be mitigated by decreasing the cone angle, decreasing wear on engine components and fuel loss during valve overlap.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the above issues and related approaches have been recognized by the inventors herein, and no admission is made as to whether such information is known to those skilled in the art.

BRIEF DESCRIPTION OF THE DRAWINGS

FIG. 4 illustrates a method that may be used during start-up to reduce wall wetting.

DETAILED DESCRIPTION

Figure 1:
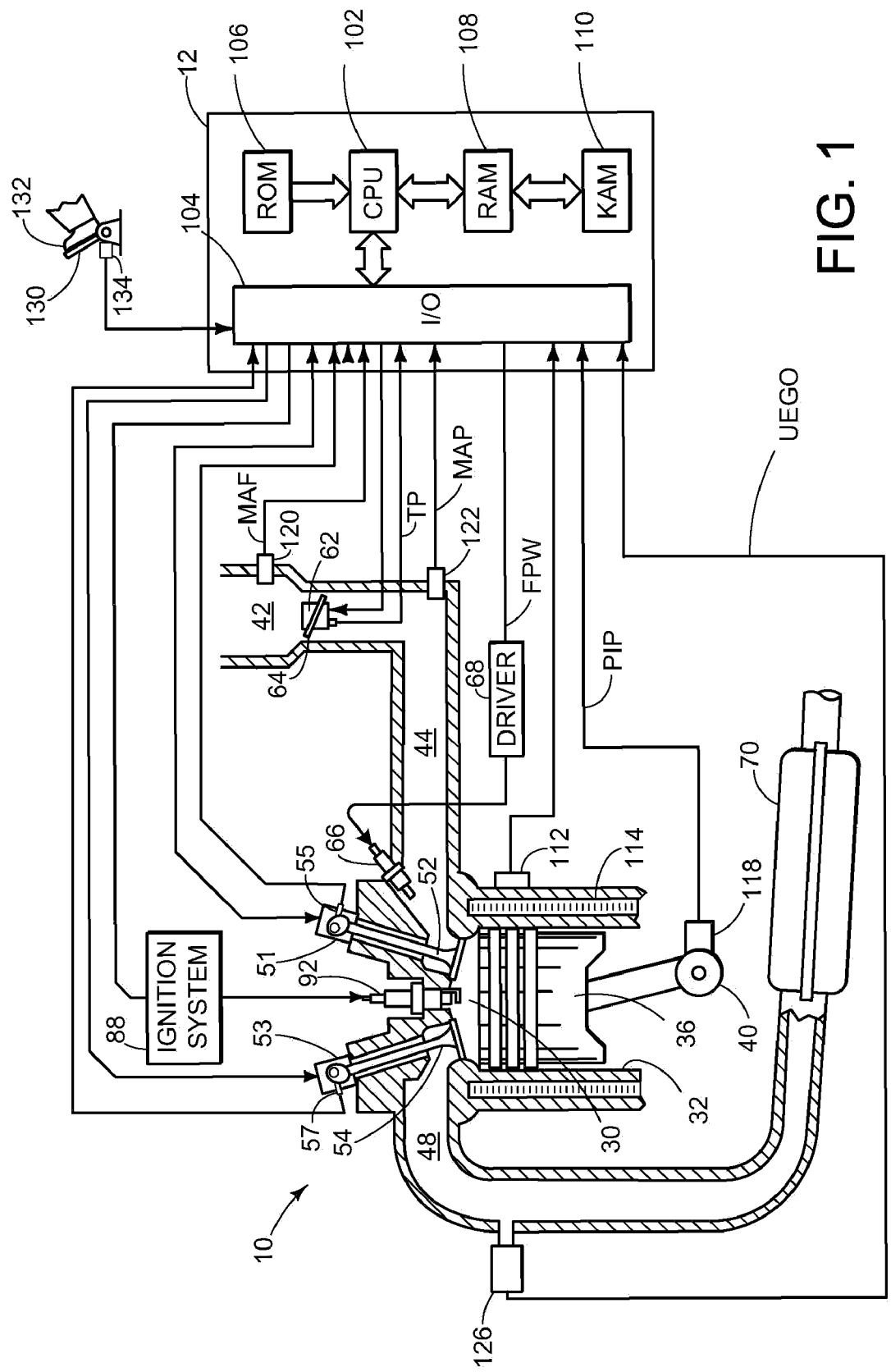
FIG. 1 is a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In a multi-cylinder engine the intake manifold may be fluidly coupled to a plurality of intake ports.

In this example, intake valve 52 and exhaust valves 54 may be controlled by cam actuation via respective cam actuation systems 51 and 53. Cam actuation systems 51 and 53 are depicted in a double overhead cam-shaft configuration. However, in other examples alternate cam-shaft configurations may be utilized, such as a single overhead cam-shaft configuration. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. In some examples, multi-point fuel injection may be utilized. Fuel injector 66 may inject fuel in proportion to the pulse width of signal FPW received from controller 12 via electronic driver 68. Fuel may be delivered to fuel injector 66 via a fuel delivery system 200, including a fuel tank 202, a fuel pump 204, and a fuel rail 210, schematically illustrated in FIG. 2A, discussed in greater detail herein. In some embodiments, combustion chamber 30 may alternatively or additionally include a fuel injector coupled directly to combustion chamber 30 for injecting fuel directly therein, in a manner known as direct injection.

Returning to FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Figure 2A:
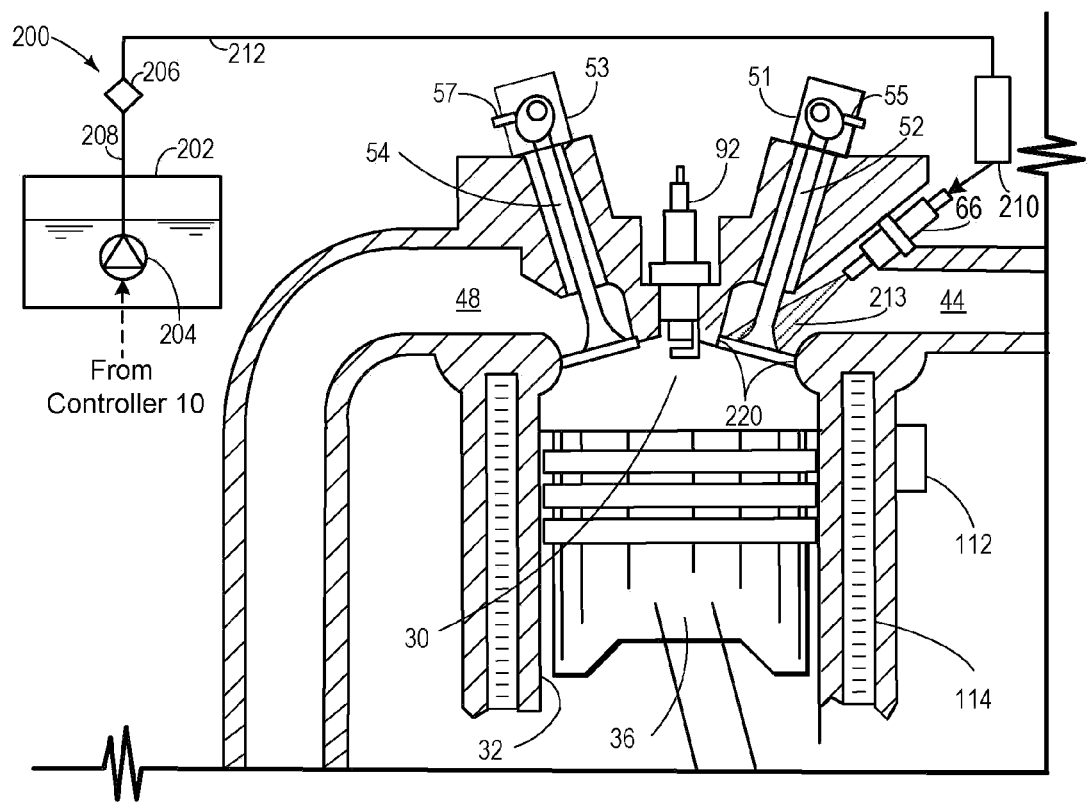
FIG. 2A illustrates a detailed view of the combustion chamber illustrated in FIG. 1 and a fuel delivery system.

FIG. 2A illustrates a detailed view of the combustion chamber and associated fuel delivery system 200 included in internal combustion engine 10, illustrated in FIG. 1. In particular, an intake valve seat 220 is depicted in FIG. 2A. The intake valve seat may include the surface against which the intake valve rests while the valve is in a closed position and in which fluidic communication between the combustion chamber and intake manifold is substantially decreased.

Fuel delivery system 200 may include a fuel tank 202 at least partially enclosing a pump 204. In some examples, pump 204 may be an electronically actuated lift pump. However, in other examples, pump 204 may be another suitable type of pump, such as a mechanically driven pump, a rotodynamic pump, etc. Pump 204 may be electronically coupled to controller 10, illustrated in FIG. 1. Continuing with FIG. 2A, a fuel filter 206 may be coupled to the pump via a fuel line 208. The fuel filter may be configured to remove unwanted particulates from the fuel. A fuel rail 210 may be coupled to the fuel filter via a fuel line 212. Likewise, fuel injector 66 may be coupled to the fuel rail. It will be appreciated that fuel rail 210 may be configured to delivery fuel to a plurality of port fuel injectors included in a multi-cylinder engine. Fuel injector 66 may be configured to deliver a fuel spray 213 into the intake manifold (e.g. intake port) during certain operating conditions.

Additional or alternate components may be included in the fuel delivery system. The components may include but are not limited to a mechanically actuated pump (not shown) positioned downstream of the lift pump, one or more check valves (not shown) positioned downstream of the lift pump, one or more solenoid valves (not shown) coupled downstream of the lift pump, a return-less fuel circuit (not shown) fluidly coupled downstream of the lift pump and to the fuel tank, etc.

In this example, the fuel utilized in fuel delivery system 200 may be partially composed of an alcohol. As one example, the fuel delivery system and therefore the engine, can utilize E85 which includes a mixture of approximately 85% ethanol and 15% gasoline. Still other engines may be configured as a flex-fuel engines, whereby a plurality of different fuel mixtures may be used by the engine. For example, a flex-fuel engine may be configured to utilize a variety of different blends of ethanol and gasoline including up to 100% gasoline, E10 which includes approximately 10% ethanol and 90% gasoline, and up to 100% ethanol. Thus, engines can utilize a variety of different fuel mixtures. Alternatively, other fuels such as methanol, diesel, hydrogen, biodiesel, etc., may be used. It will be appreciated that under certain conditions, such as during cold starts, wall wetting of the combustion chamber and/or the intake manifold may be exacerbated when a fuel having a greater alcohol concentration is utilized in the fuel delivery system. Wall wetting may include the substantial adherence and/or impingement of a fuel spray upon the walls of the combustion chamber and/or the intake manifold, particularly during open intake valve injection. An open intake valve may include an intake valve which is not seated and sealed on a valve seat, allowing the combustion chamber to be in fluidic communication with the intake manifold.

Figure 2B:
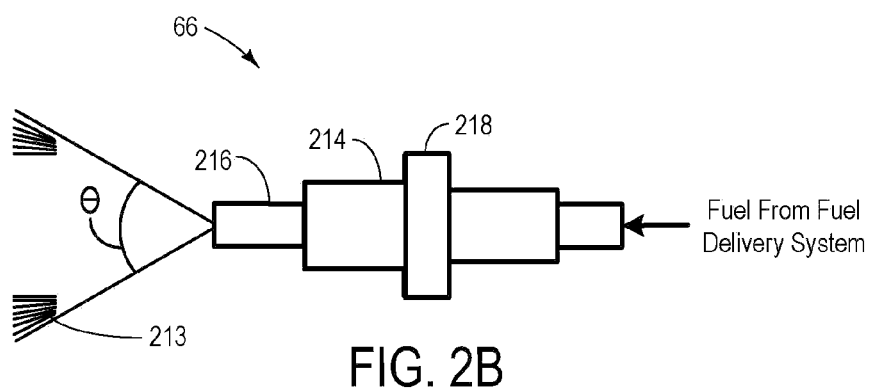
FIG. 2B illustrates a detailed view of the fuel injector shown in FIG. 2A.

FIG. 2B shows a detailed view of fuel injector 66. In this example, the fuel injector includes a main body 214, a nozzle 216, and a valve 218. The nozzle may be configured to deliver fuel spray 213, which may be in the shape of cone, into intake manifold 44. The fuel spray has an angle $\theta$. It will be appreciated that in other examples, alternate nozzles having alternate spray patterns may be used to deliver fuel into the intake manifold, such as a flat spray pattern, a hollow spray pattern, a multi-cone spray pattern, etc. Due to the characteristics of the fuel injector a change in the pressure differential across the fuel injector may alter the angle $\theta$, such as the cone angle of the fuel spray. For example, as the pressures differential is decreased, the cone angle may also be decreased. Thus, the cone angle of the fuel spray may be adjusted via an adjustment of the pressure differential across the fuel injector.

The pressure differential across the fuel injector may be altered via adjustment of the MAP and/or the fuel rail pressure, depending on operating conditions in the vehicle, such as fuel composition, intake valve position, engine temperature, ambient temperature, injection timing, etc. Under certain operating conditions, such as when the intake valve is in an open position during fuel injection, the throttle may be adjusted to alter the MAP, thereby adjusting the angle $\theta$ of the fuel spray. Additionally or alternatively, the fuel rail pressure may be adjusted to alter the angle $\theta$ of the fuel spray. Specifically, the fuel rail pressure may be adjusted via adjustment of fuel delivery system components, such as the lift pump and/or one or more valves.

The temperature of the fuel, and therefore the temperature of the fuel injector, may also affect the angle $\theta$ of the fuel spray. In the past, attempts have been made to heat the fuel via a fuel injector heating system to adjust angle of the fuel spray, such as the cone angle. However, due to the increased cost of a fuel injection heating system as well as the increased load applied to the electrical system, the fuel injection heating system may not be included internal combustion engine 10. Therefore, to adjust the cone angle the pressure differential across the fuel injector may be adjusted utilizing existing system components (e.g. the throttle and/or the fuel delivery system), as discussed above, reducing system cost. Additionally, when a fuel injection heating system is not included in the engine the amount of energy available to the starter motor is increased, thereby increasing the amount of energy which can be delivered to the combustion chamber during start-up, increasing combustion efficiency. However, a fuel injector heating system may be used in addition to the techniques noted herein, if desired.

Figure 3A:
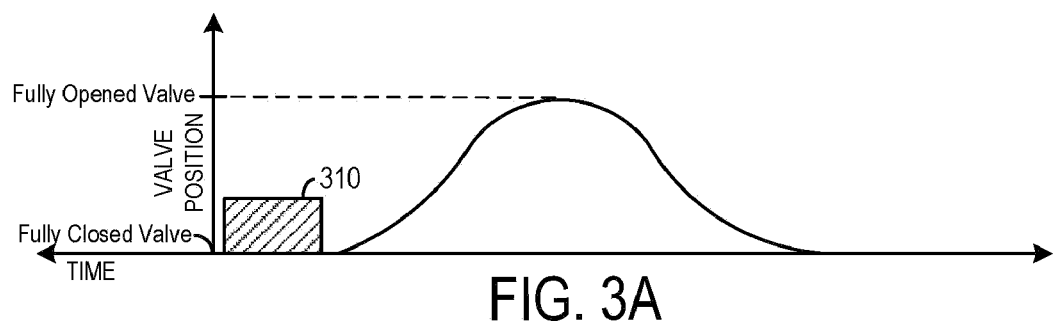
FIGS. 3A-3C show various fuel injection and fuel spray cone adjustment strategies which may be implemented during start-up.
Figure 3B:
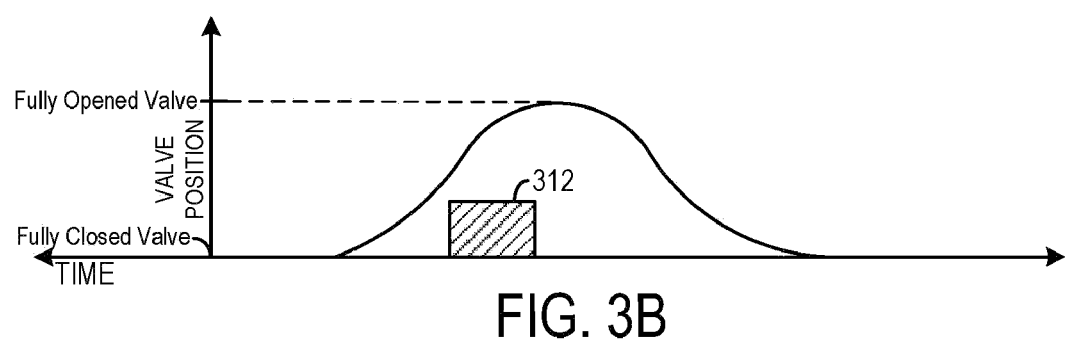
Figure 3C:
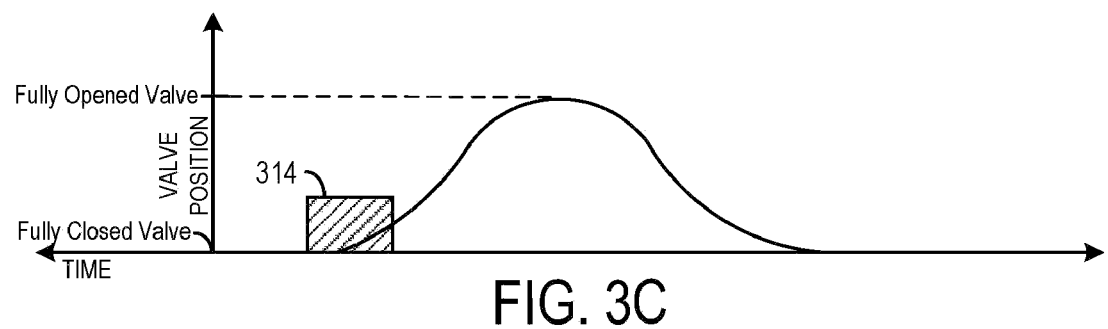

FIGS. 3A-3C illustrate various graphical depictions of fuel injection strategies which may be utilized during a start-up operation. In some examples, the start-up operation may be a cold-start. Various fuel spray cone angle adjustment strategies may be carried out during a fuel injection event during engine start-up. It will be appreciated that alternate fuel spray angles may be adjusted, in other examples. Selection of the fuel injection strategy and spray cone adjustment strategy may depend on various parameters which may include but are not limited to the position and/or actuation timing of the intake valve and/or exhaust valve, fuel composition, engine temperature, torque request, ambient temperature, MAP, injection timing, etc.

In the Figures, the y-axis represents the intake valve's position, the x-axis represents time, and the fuel injection events are represented at 310, 312, and 314. The following metrics may be used to characterize a fuel injection event: injection timing, injection amplitude, and fuel pulse width.

FIG. 3A illustrates a closed intake valve injection in which a fuel injection event 310 is executed substantially while the intake valve is closed. In this example, various cone angle adjustment strategies may be carried out during the closed intake valve injection. In particular, during the closed intake valve injection of an engine start-up (e.g., including engine cranking, engine run-up, the fuel rail pressure may be decreased via a fuel delivery system adjustment (e.g. lift pump adjustment and/or valve adjustment), to decrease the cone angle. Additionally or alternatively, the MAP may be increased via a throttle adjustment, to decrease the cone angle, until the engine has completed a selected number of combustion events, or until a preselected engine speed or engine temperature has been reached. For example, the throttle may be opened to a greater degree or alternatively may be inhibited from closing, to increase the MAP and decrease the cone angle of the fuel spray. It will be appreciated that in some examples, the fuel delivery system and the throttle may be correspondingly adjusted to achieve a desired or selected cone angle. Thus, in some examples, the fuel rail pressure and the MAP may be adjusted at concurrent or overlapping time intervals during the fuel injection event.

Due to the characteristics of the fuel injector, when the cone angle of the fuel spray is decreased, during a closed intake valve injection, the fuel puddle may be substantially localized on the valve and/or the valve seat. Therefore, the total fuel puddle mass as well as the fuel spray impingement upon the walls of the intake manifold (e.g. intake port) may be reduced, thereby decreasing the amount of fuel which travels into the exhaust passage from the intake manifold during valve overlap. Valve overlap may include a time interval during which the intake valve and the exhaust valve are at least partially open and both the intake manifold and the exhaust passage are in fluidic communication with the combustion chamber.

Additionally, under certain operating conditions, bore wash within the combustion chamber during start-up may be reduced when the spray impingement upon the walls of the intake manifold is reduced, thereby reducing total fuel puddle mass. Thus, the emissions from the vehicle as well as the wear on various engine components may be reduced when the cone angle is reduced during start-up (whereas the cone angle may be returned to its nominal value (increased) after the start-up operation). Consequently, the size of the cone angle may be selected based on the geometry of the intake manifold as well as the intake valve. Additional parameters which may be used to select the spray cone angle include the position and/or timing of the intake valve, engine temperature, ambient temperature, the fuel composition, and/or the MAP. In particular, the cone angle may be selected such that the fuel spray cone is localized to the valve and/or the valve seat during a closed intake valve injection during start-up, in some examples. In this way, fuel loss during valve overlap and/or bore wash within the combustion chamber may be decreased during start-up.

FIG. 3B depicts an open intake valve injection in which a fuel injection event 312 is executed substantially while the intake valve is open, allowing at least a portion fuel to be sprayed directly into the combustion chamber. In this example, various cone angle adjustment strategies may be carried out during the open valve injection. Specifically, during engine starting, the fuel rail pressure may be decreased to decrease the cone angle, thereby decreasing the fuel spray impingement upon the walls of the intake manifold (e.g. intake port) and/or the walls of the combustion chambers. Then, after a predetermined number of combustion events, or after engine speed rises to a selected threshold, for example, the cone angle may be increased, or returned to its nominal value. The fuel rail pressure may be decreased via a fuel delivery system adjustment (e.g. lift pump adjustment and/or valve adjustment), as described above. Additionally or alternatively, the MAP may be increased via throttle adjustment to decrease the cone angle, as described above. The increased MAP may not substantially affect the fuel loss during valve overlap due to the decreased fuel spray impingement (e.g. low fuel puddle mass) upon the walls of the intake manifold. Therefore, when the cone angle of the fuel spray is decreased during an open valve injection, the fuel losses during valve overlap and/or wall wetting within the combustion chamber may be reduced. Reduced wall wetting within the combustion chamber may lead to decreased bore wash.

It has been found through experimentation that increasing the MAP during an open valve injection increases the trapped mass in the combustion chamber during a subsequent compression stroke. Therefore, increasing the trapped mass within the combustion chamber increases the charge density, providing increased fuel vaporization during combustion as well as increased combustion temperatures. Consequently, when the MAP is increased during start-up the combustion efficiency is increased.

In some examples, the magnitude of the cone angle adjustment during an open valve injection may be disproportionate to the magnitude of the cone angle adjustment during a closed valve injection. For example, during an open valve injection the cone angle may be decreased to a greater extent than during a closed valve injection or visa-versa. However, in other examples the magnitude of the cone angle adjustment during an open and a closed intake valve injection may be substantially equivalent. Further, a degree of cone angle decrease during engine starting may depend on ambient temperature (where more of a decrease is provided at colder temperatures).

Additionally, FIG. 3C illustrates a fuel injection event 314 that is executed during a time interval while the intake valve is closed and then subsequently opened. In this example, during fuel injection event 314, the fuel rail pressure may be decreased via an adjustment of the fuel delivery system, as described above, to decrease the cone angle of the fuel spray, thereby decreasing the impingement of the fuel spray upon the walls of the intake manifold (e.g. intake port) and/or the walls of the combustion chamber. Additionally or alternatively, the MAP may be increased via throttle adjustment, as described above, to decrease the cone angle of the fuel spray. The cone angle of the fuel spray may be selected based on one or more of the following parameters: the position and/or timing of the intake valve, engine temperature, ambient temperature, the fuel composition, the MAP, and the engine temperature.

In some examples the magnitude of the cone angle adjustment during a fuel injection event in which the intake valve is closed and subsequently opened may be disproportionate to the open and/or closed intake valve injections. However, in other examples the magnitude of the cone angle adjustment during a fuel injection event in which the intake valve is closed as subsequently opened may be substantially proportional to the magnitude of the cone angle adjustment during an open and/or closed intake valve injection. It will be appreciated that the aforementioned control strategies are exemplary in nature, and a multitude of control strategies may be used during start-up to adjust the cone angle of the fuel spray.

Furthermore, when a fuel at least partially composed of alcohol is used in the fuel delivery system, bore wash within the cylinder as well as fuel loss during valve overlap may be increased, during certain operating conditions (e.g. cold-start), due to the fuel impingement upon the walls of the intake manifold and/or the combustion chamber. In particular, as the amount or percentage of alcohol in the fuel is increased bore wash and fuel loss is further exacerbated for various reasons, such as the fuel volatility, the degrading effects of alcohol on engine oil, etc. Therefore, in some examples, the cone angle of the fuel spray may be reduced as the amount or percentage of the alcohol in the fuel is increased, to decrease fuel loss during valve overlap as well as bore wash. In this way, the engine operation may be improved, decreasing emissions and engine wear as well as increasing efficiency.

Additionally, as the engine temperature (e.g. cylinder temperature) increases, the cone angle of the fuel spray may have less of an effect on wall wetting, due to the increased vaporization of the fuel. Furthermore, as the MAP is drawn down, subsequent to start-up, the fuel loss during valve overlap may be decreased. Therefore, when the temperature of the engine and/or the MAP reaches a threshold value, the cone angle of the fuel spray may be increased. In some examples, the cone angle of the fuel spray may be increased when a negative pressure balance between the intake manifold and the exhaust passage is reached. Additionally or alternatively, the fuel spray cone angle may be increased when the engine has completed a pre-determined number of combustion cycles, subsequent to start-up.

FIG. 4 shows a method 400, which may implemented to adjust the cone angle of the fuel spray from a port fuel injector during start-up. In some examples, method 400 may be implemented utilizing the systems and components, described above. Alternatively, in other examples, method 400 may be implemented utilizing other suitable systems and components.

At 410 the method may include initiating start-up operation. One or more of the following actions may be carried out to initiate start-up operation: actuating an ignition apparatus (e.g. rotation of an ignition key), powering a controller, powering a starter motor, initiating a crank-start sequence, starting the engine from rest, etc. Next, at 412, it may be determined if the engine is below a threshold temperature. The threshold temperature may be calculated utilizing one or more of the following parameters: fuel composition, ambient temperature, and atmospheric pressure. In some examples, method 400 may be implemented during a cold-start operation when the ambient temperature is approaching the engine temperature. Further in other examples, step 412 may not be included in method 400.

If the engine is not below a threshold temperature the method ends. However, if the engine is below a threshold temperature, it may be determined, at 414, if the MAP is above a threshold value. The threshold MAP may be calculated based on one or more of the following parameters: exhaust passage pressure, ambient temperature, and atmospheric pressure. However, in other examples step 414 may not be included in the method. Further in other examples, it may be determined if the total number of combustion cycles performed after start-up have surpassed a threshold value.

If it is determined that the MAP is not above a threshold value the method ends. However, if it is determined that the MAP is above a threshold value, the method proceeds to 416 where the composition of the fuel is determined.

Next, the method advances to 417, where a fuel injection event is initiated, upstream of the intake valve from a port fuel injector. It will be appreciated that in some examples steps 418-420 may be implemented during the fuel injection event. Next, method 400 proceeds to 418, where the MAP is adjusted based on fuel composition and/or a position of the intake valve, to decrease the cone angle of the fuel spray, thereby decreasing wall wetting within the intake passage and/or the combustion chamber. The MAP may be altered via throttle adjustment, at 418a. In some examples, the MAP may be adjusted based on the amount or percentage of alcohol contained within the fuel. Specifically, the MAP may be increased as the percentage of alcohol in the fuel is increased or visa-versa. In this way, the bore wash caused by the alcohol in the fuel may be decreased. Still further in other examples, the MAP may be adjusted based on the position of the intake valve. In particular, the MAP may be increased to a greater degree during an open valve injection when compared to a closed valve injection or visa-versa.

After 418 the method may also proceed to 420, where the fuel pressure within the fuel delivery system is adjusted based on the fuel composition and/or the position of the intake valve, to decrease wall wetting within the intake manifold and/or combustion chamber. Adjustment of the fuel pressure may include at 420a, adjusting one or more pumps within the fuel delivery system and at 420b, adjusting one or more valves within the fuel delivery system. In some examples, the fuel pressure within the fuel delivery may be decreased based on the alcohol composition of the fuel. Specifically, the fuel pressure in the fuel delivery system (e.g. fuel rail pressure) may be decreased as the percentage of alcohol in the fuel is increased or visa-versa. Furthermore, the fuel pressure may be adjusted based on the position of the intake valve. For example, the fuel pressure may be decreased to a greater extent during an open valve injection when compared to a closed valve injection or visa-versa.

Next, in some examples, method 400 may proceed to 422, where it is determined if the engine is above a threshold temperature. Alternatively or additionally, it may be determined if the engine has reached a threshold MAP. The threshold temperature and/or MAP may be calculated based on one or more of the following parameters: ambient temperature, fuel composition, requested torque, air-fuel ratio, exhaust pressure, exhaust gas temperature, and valve timing. Still further in alternate or additional examples, it may be determined if a threshold number of combustion cycles, which may be predetermined, have occurred subsequent to the initiation of start-up operation.

If it is determined that the engine is not above a threshold temperature the method may return to 422. However, if it is determined that the engine is above a threshold temperature method 400 may advance to 424, where the cone angle of the fuel spray is increased. Increasing the fuel spray cone angle may include discontinuing the MAP and/or fuel pressure adjustments at 424a. For example, the MAP may be decreased and/or the fuel pressure (e.g. fuel rail pressure) within the fuel delivery system may be increased, thereby increasing the cone angle of the fuel spray.

The system and method described above allows the wall wetting within the intake manifold and/or combustion chamber to be decreased during start-up, thereby decreasing fuel losses during valve overlap, as well as bore wash, in some examples. In this way, the longevity of various engine components and engine performance may be increased.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operation of an internal combustion engine including an intake valve coupled to a combustion chamber, and a port fuel injector positioned upstream of the intake valve in an intake manifold including a throttle, the port fuel injector fluidly coupled to a fuel rail included in a fuel delivery system housing a fuel at least partially composed of alcohol, the method comprising:

during a start-up operation when the temperature of the engine is below a threshold value and fuel is actively being injected into the intake manifold, adjusting a cone angle of a fuel spray from the port fuel injector, via adjustment of the throttle and/or fuel delivery system, based on the position of the intake valve.

2. The method according to claim 1 wherein cone angle is further adjusted based on an alcohol content of the fuel, where for a first, lower alcohol content, a first larger cone angle is provided, and for a second, higher, alcohol content, a second, smaller, cone angle is provided.

3. The method according to claim 1 wherein the adjusting of the cone angle includes decreasing the cone angle during the start-up operation during at least partial open intake valve injection, and then increasing the cone angle, from the decreased cone angle, after manifold pressure falls below a threshold value.

4. The method according to claim 3 wherein the throttle is adjusted to increase a manifold air pressure.

5. The method according to claim 1 wherein the cone angle is decreased during the start-up operation during closed intake valve injection.

6. The method according to claim 1 further comprising increasing the cone angle, subsequent to start-up operation, when the engine temperature has reached a threshold value.

7. The method according to claim 6 wherein the threshold value is calculated utilizing one or more of a fuel composition, ambient temperature, requested torque, and air-fuel ratio.

8. The method according to claim 1 wherein the start-up operation includes a crank-start sequence.

9. The method according to claim 1 wherein adjustment of the fuel delivery system includes decreasing the fuel rail pressure via adjustment of one or more pumps and/or valves included in the fuel delivery system.

10. A method of operation of an internal combustion engine including an intake valve coupled to a combustion chamber, and a port fuel injector positioned upstream of the intake valve in an intake manifold including a throttle, the port fuel injector fluidly coupled to a fuel rail included in a fuel delivery system housing a fuel at least partially composed of alcohol, the method comprising:
   during a start-up operation when the engine temperature is below a threshold value and before manifold pressure has been pumped down below a pressure threshold, during a fuel injection event when fuel is actively being injected into the intake manifold, and during intake to exhaust valve overlap conditions, decreasing a cone angle of a fuel spray from the fuel injector via adjustment of the throttle and/or the fuel delivery system, where an amount of decrease is based on an alcohol content of the fuel.

11. The method according to claim 10 wherein the fuel injection event occurs at least partially during an open intake valve.

12. The method according to claim 11 wherein the throttle is adjusted to increase a manifold air pressure and the fuel injection event occurs substantially while the intake valve is open.

13. The method according to claim 10 wherein the fuel injection event is implemented during a time interval while the intake valve is in a closed and an open positioned.

14. The method according to claim 10 further comprising subsequent to start-up operation when the temperature of the engine has surpassed a threshold value, increasing the cone angle.

15. The method according to claim 10 wherein a fuel rail pressure is decreased via actuation of one or more pumps and/or valves within the fuel delivery system, to decrease the cone angle.

16. A system for an internal combustion engine comprising:
   a combustion chamber including an intake valve fluidly coupled to an intake manifold and an exhaust valve fluidly coupled to an exhaust passage;
   a fuel delivery system including a fuel rail coupled to one or more port fuel injectors, the port fuel injector(s) positioned upstream of the intake valve in the intake manifold, and a fuel tank fluidly coupled to the fuel rail, the fuel tank housing a fuel at least partially composed out of alcohol;
   a throttle positioned upstream of the fuel injector within the intake manifold;
   a control system having computer readable storage medium, the medium comprising code for, during start-up operation when the engine temperature is a below a threshold value and fuel is actively being injected into the intake manifold, decreasing a cone angle of a fuel spray from the port fuel injector via adjustment of a manifold air pressure and/or a fuel rail pressure during open valve fuel injection, where an amount of adjustment to the cone angle is based on an amount of alcohol in the fuel.

17. The system of claim 16 wherein the manifold air pressure is increased via a throttle adjustment when the intake valve is open.

18. The system of claim 16 wherein the cone angle is decreased as a percentage of alcohol within the fuel is increased, the method further comprising code for operating the engine with an increased cone angle compared to the decreased cone angle after the start-up operation.

19. The system of claim 16 wherein the fuel delivery system includes an electronically actuated lift pump.

20. The system of claim 19 wherein adjustment of the fuel delivery system includes adjusting the lift pump.

* * * * *